UNITED STATES PATENT OFFICE.

CHESTER B. DURYEA, OF NEW YORK, N. Y.

PROCESS FOR PRODUCING SYRUPS AND SUGARS.

1,110,755.     Specification of Letters Patent.     Patented Sept. 15, 1914.

No Drawing.     Application filed April 12, 1911. Serial No. 620,672.

*To all whom it may concern:*

Be it known that I, CHESTER B. DURYEA, a citizen of the United States, and resident of the borough of Brooklyn, in the city and State of New York, have invented a new and useful Process for Producing Syrups and Sugars, of which the following is a specification.

This invention relates to the manufacture of liquid and solid enzymic saccharification products of starch using unmalted, *i. e.* unsprouted, grains as the basic raw material.

The chief objects of this invention are relative economy and simplicity as compared with other known processes for producing similar products; mainly in the point of utilizing an active enzymic extract made from the raw material to be operated upon in the process, for the purpose of effecting saccharification at the proper step in the process.

In carrying out this process, it is feasible to use various grains and tubers as raw material, but it is especially directed to industrial operations upon maize.

For the purpose of clearly illustrating my new process, I shall describe one method of carrying it out, utilizing unmalted maize as the raw material. A portion of the maize to be used is specially treated so as to furnish an active enzymic extract. This may be accomplished by coarsely grinding the grain and subjecting the grist with or without agitation, to the action of water at ordinary or elevated temperatures. The resulting extract is drawn or filtered off and set aside for use later on in the process. The extracted portion of the mass (*i. e.* that portion from which the extract has been drawn) may be returned to the main mass and the whole steeped with very dilute sulfurous acid at a temperature of about 115° to 117° F. as is customary. Degermination, milling and sieving may then be proceeded with and the starch liquors resulting therefrom passed over well known runs or tables, for depositing the well known crude green starch. This crude green starch, produced as above outlined, is then placed in suspension with water at a gravity of about 20° Bé., acidified to the extent of about 0.1 to 0.2 per cent. of hydrochloric acid on the weight of the total water present, and the temperature raised to about 55° C. preferably not exceeding that degree when employing maize starch. Heating may advantageously be continued for from about two to eight hours, depending upon the acidity and temperature of the mass, the character of the starch, etc. and the result desired. During all this time the starch is maintained in suspension by any well known or approved agitating mechanism. After the starch liquor has been thus treated for the desired period, it is diluted with water to about 5° Bé. and passed over the well known runs or tables, thus producing a purified modified starch. This purified modified starch is lifted from the runs and placed in suspension with water at a gravity of about 16° Bé., acidified, preferably with hydrochloric acid, to the extent of about 0.01 to 0.02 of one per cent. of apparent free HCl, on the total water present, methyl orange being used as the indicator; and the mass cooked under a steam pressure of about 30 pounds per square inch for from about twenty to forty minutes, depending upon the extent of modification of the starch, acidity of the mass, steam pressure, etc. and the result required. The charge is then blown out from the cooker, neutralized with a suitable alkali, such as soda-ash, and cooled to about 58° C. The previously prepared enzymic maize extract is then added to the cooked and neutralized purified, modified starch paste, produced by the steps above outlined, and saccharification carried to the desired point, while the temperature is maintained at about 58° C. When this conversion or saccharification has reached the required point, refining and concentration may be carried out according to well known and established ways and means.

The above detailed process given as an example of one way of carrying out my invention, may be varied in many particulars and details to suit the particular kind and character of raw material, general manufacturing conditions, etc. as well as the requirements of the particular product desired, while still operating within the spirit and scope of my invention. I desire it to be particularly understood that I do not intend to limit myself to the specific duration or intensity of the steps above outlined, but intend to cover the general process set forth under varying conditions of acidity, temperature, time, character of acid, character of neutralizing agent, indicator, etc. I also desire it to be clearly understood that in using the word "modified," I do not intend to limit the extent of modification or conversion to the range of modification of commercial thin boiling starches, but intend to include any appreciable extent of modification. And I further state that in any future controversy as to the scope of the claims appended hereto, that they are not to be limited to the specific details described except in so far as the state of the prior art may compel such limitation.

What I claim is:

1. The process of producing syrups, sugars and the like, comprising first, providing crude green starch, second, cooking it, and third, saccharifying the cooked starch by association with an extract of unmalted grain.

2. The process of producing syrups, sugars and the like, comprising first, providing crude green starch, second, modifying it, third, cooking the modified starch, and fourth, saccharifying the cooked modified starch by association with an extract of unmalted grain.

3. The process of producing syrups, sugars and the like, comprising first, providing crude green starch, second, modifying it, third, purifying the modified starch, fourth, cooking the purified modified starch, and fifth, saccharifying the cooked purified modified starch by association with an extract of unmalted grain.

4. The process of producing syrups, sugars and the like, comprising first, providing crude green starch, second, modifying it, third, purifying the modified starch, fourth, cooking with acid the purified modified starch, fifth, neutralizing the cooked, purified, modified starch, and sixth, saccharifying the neutralized, cooked, purified, modified starch by association with an extract of unmalted grain.

5. The process of producing syrups, sugars and the like, comprising first, providing crude green starch, second, modifying it, third, purifying the modified starch, fourth, cooking with acid the purified modified starch, fifth, neutralizing the cooked, purified, modified starch, sixth, saccharifying the neutralized, cooked, purified, modified starch by association with an extract of unmalted grain, and seventh, refining and concentrating the saccharified starch paste.

6. The process of producing syrups, sugars and the like, comprising first, providing an unmalted grain, second, making an extract from a portion thereof, third, treating the extracted and unextracted grain for the production of crude green starch, fourth, modifying the crude green starch, fifth, purifying the modified starch, sixth, cooking with acid the purified, modified starch, seventh, neutralizing the cooked starch paste, eighth, saccharifying the neutralized, cooked starch paste by association with the said extract, and ninth, refining and concentrating the saccharified starch paste.

7. The process of producing syrups, sugars and the like, comprising first, providing a modified starch, second, cooking it, and third, saccharifying the cooked starch by association with an extract of unmalted grain.

8. The process of producing syrups, sugars and the like, comprising first, providing a purified, modified starch, second, cooking it, and third, saccharifying it by association with an extract of unmalted grain.

In testimony, that I claim the foregoing as my invention, I have signed my name in presence of two witnesses, this eighth day of April 1911.

CHESTER B. DURYEA.

Witnesses:
F. GEORGE BARRY,
HENRY C. THIEME.